(12) United States Patent
Narayanaswamy

(10) Patent No.: US 7,168,305 B2
(45) Date of Patent: Jan. 30, 2007

(54) METHOD OF SECURING TIRE PRESSURE MONITORING DEVICE TO WHEEL

(75) Inventor: Karthikeyan R. Narayanaswamy, Canton, MI (US)

(73) Assignee: Siemens VDO Automotive Corporation, Auburn Hills ( * ) Notice: Subject to any disclaimer, the term of this patent is extended or adjusted under 35 U.S.C. 154(b) by 105 days.

(21) Appl. No.: 10/969,264

(22) Filed: Oct. 20, 2004

(65) Prior Publication Data

US 2005/0132793 A1    Jun. 23, 2005

Related U.S. Application Data

(60) Provisional application No. 60/530,390, filed on Dec. 17, 2003.

(51) Int. Cl.
*G01M 17/02*    (2006.01)

(52) U.S. Cl. ........................................................ 73/146

(58) Field of Classification Search .................. 73/146, 73/146.5, 146.2, 146.3, 146.4; 340/442, 340/444, 445

See application file for complete search history.

(56) References Cited

U.S. PATENT DOCUMENTS

| | | | |
|---|---|---|---|
| 3,760,350 A * | 9/1973 | Johnson | 340/442 |
| 4,235,184 A | 11/1980 | Schiavone | |
| 4,954,677 A * | 9/1990 | Alberter et al. | 200/83 Y |
| 5,452,608 A | 9/1995 | Green | |
| 6,655,203 B2 * | 12/2003 | Hsu | 73/146.8 |
| 6,694,807 B2 * | 2/2004 | Chuang et al. | 73/146.5 |
| 2003/0126918 A1 * | 7/2003 | Chuang et al. | 73/146 |
| 2004/0183658 A1 * | 9/2004 | Yamagiwa et al. | 340/427 |

\* cited by examiner

*Primary Examiner*—Andre J. Allen

(57) ABSTRACT

A method of securing a tire pressure-monitoring device to a vehicle wheel includes the steps of welding a bracket within a tire wheel well. The bracket assembly includes a weld surface that corresponds to a surface on the wheel rim. The weld surface includes a common curvature that matches the surface of the wheel and also includes a material compatible with welding to the wheel rim.

7 Claims, 3 Drawing Sheets

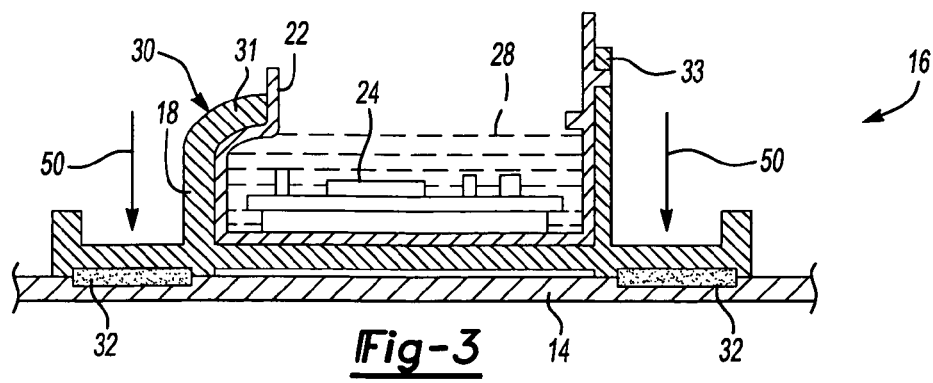
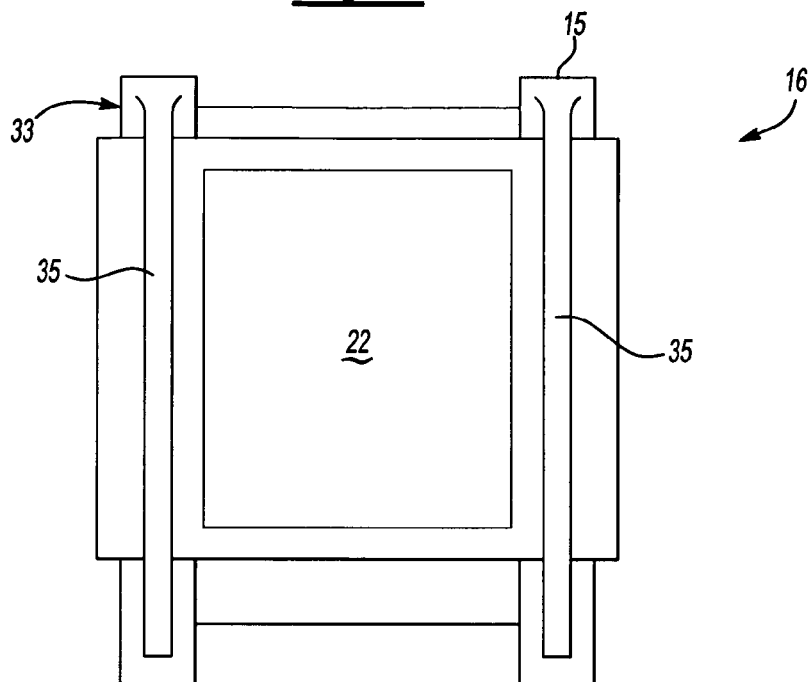
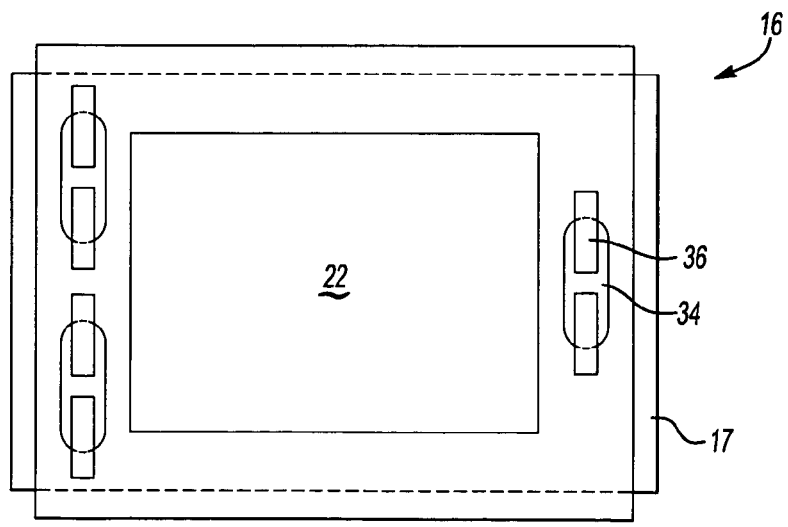

METHOD OF SECURING TIRE PRESSURE MONITORING DEVICE TO WHEEL

The application claims priority to U.S. Provisional Application No. 60/530,390, which was filed on Dec. 17, 2003.

BACKGROUND OF THE INVENTION

A tire pressure-monitoring device provides information on current tire conditions. The conditions within the tire that are monitored by the device include air pressure, temperature and other characteristics indicative of current tire conditions. The tire pressure-monitoring device is most often included as a part of the tire air valve assembly. In this way the tire pressure-monitoring device is assembled along with the tire air valve into an opening provided within a wheel rim. Such installation techniques require that the wheel rim be fitted with a counter balance to offset the imbalance created by the added weight of the tire pressure monitoring system on the valve •stem. Further, the joint between the valve stem body and a wheel rim is susceptible to corrosion due to electrolytic reactions caused by brake dust against the junction between the valve stem and the wheel rim.

It is also known to secure a tire pressure monitoring device within the tire well of a wheel rim with a strap that extends about the circumference of the wheel. This strap is tightened down against the wheel and provides for the mounting of the tire pressure-monitoring device independent of the valve stem. The strap is most often a metal strap that is drawn tight by mechanical fastening means.

As appreciated, such methods of mounting a tire pressure-monitoring device create certain challenges to assembly and durability of a wheel assembly. It is therefore desirable to design a mounting configuration for a tire pressure-monitoring device that does not adversely affect tire balance and also that provides a durable reliable connection. Further, it is desirable to develop a method for securing a tire-monitoring device within a wheel that is cost effective to assembly.

SUMMARY OF THE INVENTION

The example tire pressure monitoring mounting device of this invention includes a bracket that is welded to an inner surface of a wheel rim.

This invention includes a method of securing a bracket or a tire pressure monitoring device within a tire well of a rim utilizing a friction welding technique. The method includes a step of holding a bracket assembly against a wheel rim in a desired location. The bracket assembly includes a weld surface that corresponds to a surface on the wheel rim. The weld surface includes a common curvature that matches the surface of the wheel and also includes a material compatible with welding to the wheel rim.

The wheel is rotated relative to the bracket assembly at a speed that combined with a downward force will generate heat both in the bracket and in the wheel to create a weld. Once a sufficient amount of heat has generated by the relative rotation between the bracket and the wheel. The wheel is stopped with the bracket in a desired location. An added force is exerted on the bracket to complete the weld. Once the bracket and wheel have cooled the bracket is welded and becomes an integral part of the wheel assembly.

Once the bracket is secured to the wheel assembly the tire pressure monitoring device can be attached to the bracket. The bracket can comprise any type of clip that corresponds to the features of the tire pressure-monitoring device.

Accordingly, the method and assembly of this invention provides a robust, reliable, and cost effective way of securing a tire pressure-monitoring sensor within a wheel assembly.

These and other features of the present invention can be best understood from the following specification and drawings, the following of which is a brief description.

BRIEF DESCRIPTION OF THE DRAWINGS

FIG. 3 is a cross-sectional view of the tire pressure-monitoring device mounted to a wheel according to this invention.

FIG. 4 is a schematic view of an attachment means between the bracket assembly and tire pressure-monitoring device.

FIG. 5 is another top view of a tire pressure-monitoring configuration according to this invention.

DETAILED DESCRIPTION OF THE PREFERRED EMBODIMENT

Figure 1:
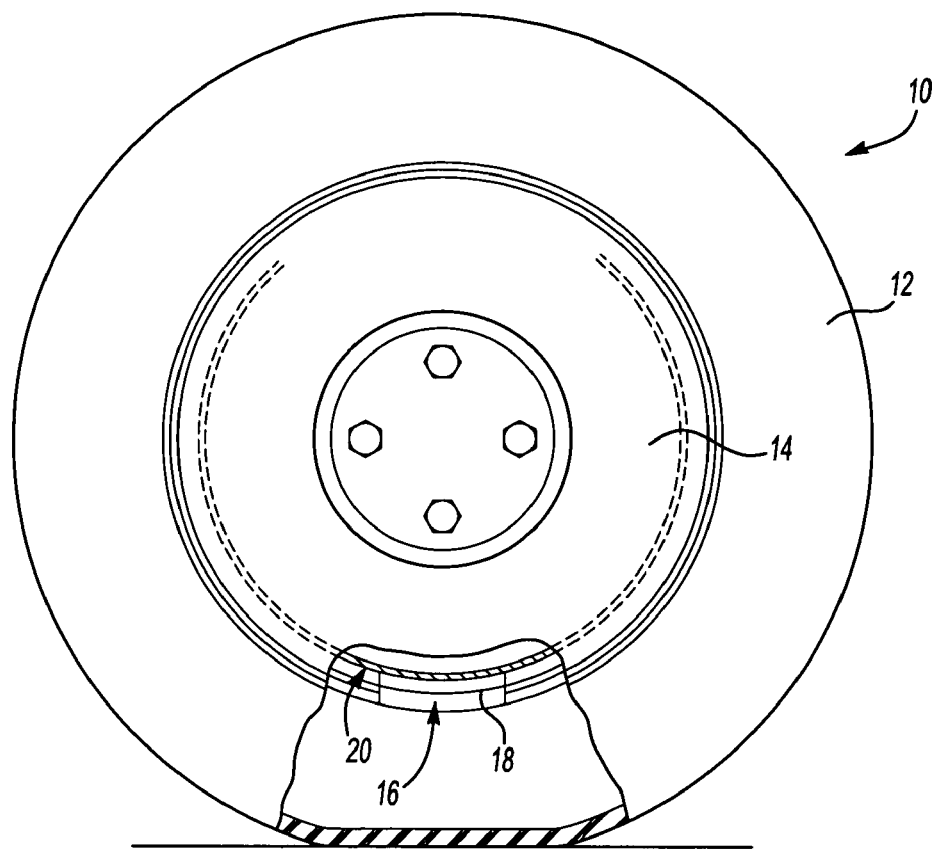
FIG. 1 is a cut away view of a tire assembly including a tire pressure-monitoring device mounted according to this invention.

Referring to FIG. 1, a wheel assembly 10 includes a tire 12 mounted to a rim 14. A bracket 18 is mounted to an inner surface 20 of the rim 14 and supports a tire pressure monitoring assembly 16. The bracket 18 is welded to the inner surface 20 of the rim 14. The bracket 18 is friction welded to the inner surface 20. Although friction welding is shown and discussed it is within the contemplation of this invention to secure the bracket 18 to the inner surface 20 of the wheel rim 14 by any welding means known to a worker versed in the art.

Figure 2:
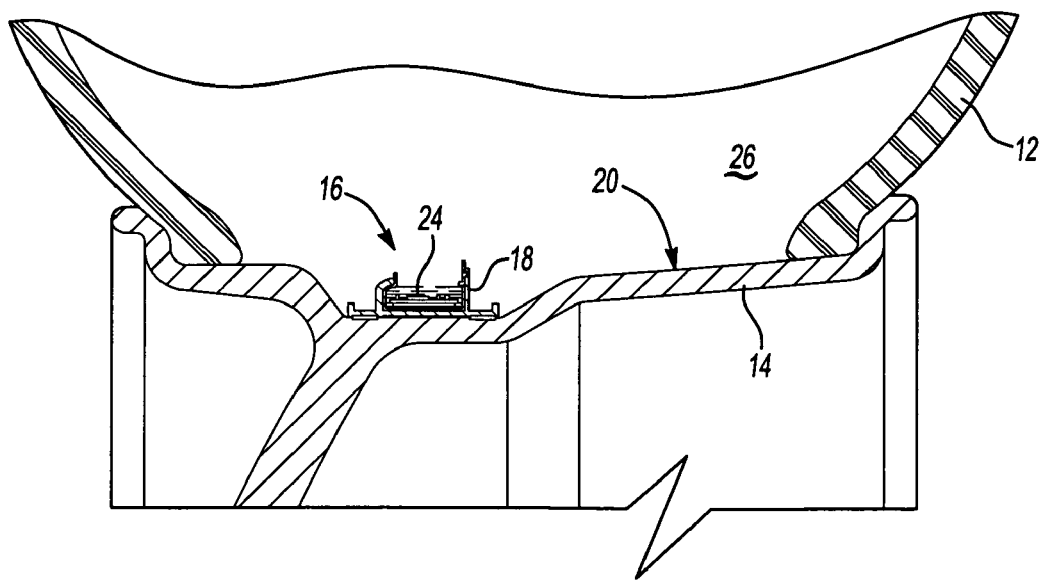
FIG. 2 is a cross-sectional view of the tire assembly with the tire pressure-monitoring device mounted according to this invention.

Referring to FIG. 2, the tire 12 is mounted to the rim 14 and defines a tire well 26. The tire well 26 is a portion of the rim 14 between the outermost walls that support attachment of the tire 12. The specific shape of the tire well 26 is as commonly known. The wheel inner surface 20 of the wheel rim 14 includes a surface that corresponds to the desired configuration of the wheel assembly 10. That is, the inner surface 20 is not a planar surface in that there are specific curved surfaces and contours that are required to provide for mounting of the tire 12 and to accommodate mounting configurations for the wheel assembly 10.

The bracket 18 secures the tire pressure-monitoring assembly 16 to a surface of the wheel rim 14 that is offset from a centerline. The specific location of the tire pressure monitoring assembly 16 is provided to minimize any imbalance that may be caused by the additional weight and mass of the tire pressure monitoring assembly 16.

The tire pressure monitoring assembly 16 includes a plurality of electronics 24. Typically, the electronics 24 include sensors for sensing pressure and temperature within the tire and a transmitter for transmitting signals indicative of conditions within the tire 12 to an external controller. The specific configuration of the tire pressure monitoring assembly 16 is as known. A worker skilled in the art with the benefit of this disclosure would understand that many different tire pressure-monitoring devices are within the contemplation of this invention.

The bracket 18 is welded to the rim 14 along the inner surface 20. The tire pressure-monitoring assembly 16 is in turn attached to the bracket 18. In one example, the bracket 18 is friction welded to the wheel rim, however, other welding methods such as spot welding, brazing and laser welding are within the contemplation of this invention.

Referring to FIG. 3, an enlarged cross-sectional view of the tire pressure monitoring assembly 16 is shown mounted to the bracket 18. The tire pressure monitoring assembly 16 includes a housing 22 that is filled with a potting material 28 that supports and protects the electronics 24. Bracket 18 includes a clip 30 that holds the housing 22 in its desire location. The bracket 18 also includes a weld segment 32. The weld segment 32 corresponds with the inner surface of the wheel rim 14 and provides for welding of the bracket 18 to the inner surface 20 of the wheel rim 14.

In a friction welding process, a force schematically indicated by arrows 50 is exerted downwardly on the bracket 18 to hold the bracket 18 against an inner surface 20 of the wheel rim 14. The wheel rim 14 is then rotated at a speed that generates sufficient heat both in the bracket 18 and in the localized surfaces of the wheel rim 14 that correspond to the position of the bracket 18. Upon the sufficient generation of heat between the bracket 18 and the inner surface 20 the wheel rim 14 is stopped. An additional force is exerted upon the bracket 18 downwardly to force the bracket 18 against the wheel rim 14 to complete the friction welding operation. Once the bracket 18 and wheel rim 14 has cooled the bracket 18 will be welded to the wheel rim 14 and secured there in place.

The tire pressure monitoring assembly 16 can than be clipped into the bracket 18 by way of the clip 30. The clip 30 as is shown in FIG. 3 comprises a lip portion 31 and tab portion 33. The lip portion 31 and tab portion 33 cooperate with features of the housing 22 to secure the tire pressure monitoring assembly 16 to the bracket 18. A specific configuration of a clip 30 for securing the housing 22 to the bracket 18 is shown in FIG. 3. A worker versed in the art with the benefit of this disclosure would understand that other clip configurations as are known are also within the contemplation of this invention.

Referring to FIG. 4, another bracket 15 is illustrated that includes clip 33. The clip 33 includes two elongated arms 35 that provide a tensile force to secure the housing 22. The housing 22 includes flat surfaces that correspond with the clip 33. The housing 22 is simply slid under the clip 33 and held there in place.

Referring to FIG. 5, another tire pressure monitoring assembly 16 is illustrated along with another bracket 17. The bracket 17 that includes a tab 36 that corresponds with slot 34 disposed within the housing 22. The housing 22 is then slid onto and secured by the tabs 36. The tabs 36 compress to allow the tabs 36 to fit through the slot 34 and then expand outwardly from the slot 34 to prevent removal of the housing 22.

Figure 6:
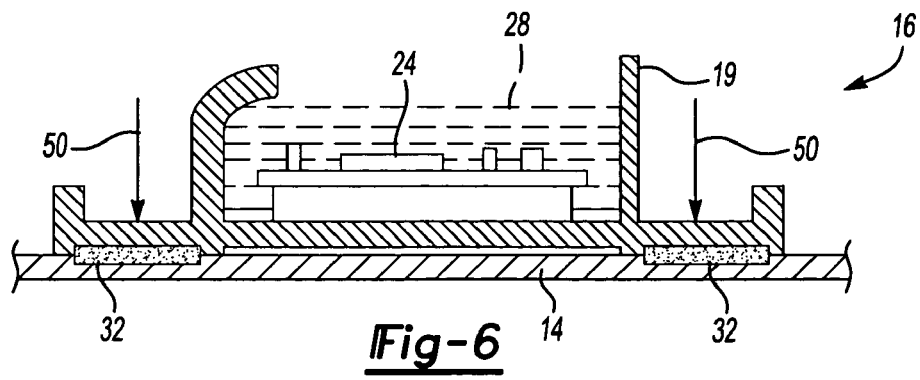
FIG. 6 is a cross-sectional view of another tire pressure monitoring device mounted to a wheel according to this invention.

Referring to FIG. 6, another bracket 19 according to this invention is illustrated that includes the tire pressure monitoring assembly 16. In this embodiment the tire pressure monitoring assembly 16 is integrally formed within the bracket 19. The bracket 19 defines a cavity into which the electronics 24 are placed. Potting 28 is then utilized to fill the cavity in which the electronics 24 is placed to support the electronics and protect them. The bracket 18 is then friction welded to the wheel rim 14. In this way no clip configuration is required in that the tire pressure-monitoring device sticks permanently to the wheel rim 14. Further, the number of component parts is reduced. In this embodiment, the bracket 19 includes the weld segment 32 and also finds portions of the housing 22 that define the space into which the electronics 24 for the tire pressure-monitoring assembly 16 are secured.

Figure 7:
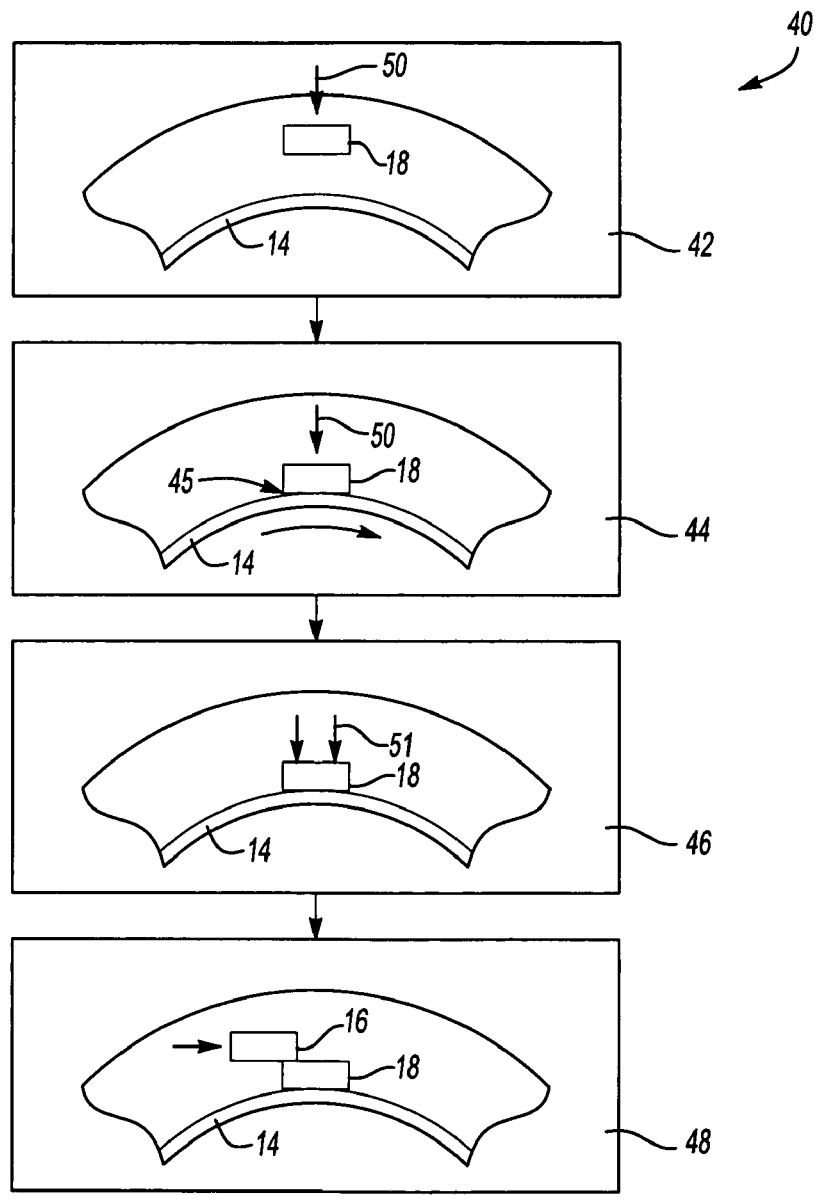
FIG. 7 is a block diagram illustrating a method of securing and welding a tire pressure monitoring attachment device to a wheel assembly according to this invention.

Referring to FIG. 7, a block diagram schematically illustrating the method of securing the tire pressure monitoring assembly 16 of this invention is shown. In a first step 40 indicated and illustrated at 42 a bracket 18 is placed and held under a force 50 against the surface of the wheel rim 14. Location step 44 includes the step of applying a force on the bracket 18 against the rotating rim 14 to generate heat in the bracket 18 and in the wheel rim 14. The interface is schematically indicated and shown at 45 between the wheel rim 14 and bracket 18 that generates sufficient heat to melt the materials in both the bracket 18 and the rim 14 to a point as to enable a bond to be formed between the two.

Once a desired amount of heat has been generated both in the bracket 18 and in the wheel rim 14, the rim 14 is stopped at a desired mounting location on the rim 14. This location is pre-determined such that the tire pressure monitoring assembly 16 will be placed in a location on the wheel that provides and minimizes potential counter balance requirements. Once the rim 14 has stopped rotating an additional force 51 is added to press the bracket 18 against the wheel rim 14. The additional forces as indicated at step 46 provide for adhesion between wheel rim 14 and bracket 18. The specific rotational speed and forces required to build the friction and generate the heat required are as known to a worker skilled in the art. A worker skilled in the art with the benefit of this disclosure would understand how to apply friction-welding techniques to the mounting of the tire pressure-monitoring bracket 18 to the wheel rim 14. Once the bracket 18 has been bonded and adhered to the rim 14 the tire pressure monitoring assembly 16 is mounted to the bracket 18. Alternatively, as is shown in FIG. 6, the electronics are already mounted within the bracket 18 and therefore is already mounted in the proper location.

Accordingly, the method in the place of this invention provides an effective reliable and cost-effective means of securing a tire pressure monitoring system within a wheel assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of securing a tire pressure sensor to a wheel, said method comprising the steps of:
   (a) holding a bracket adapted for securing the tire pressure sensor against a surface of the wheel;
   (b) rotating the wheel relative to the bracket;
   (c) generating heat in both the wheel and the bracket;
   (d) stopping rotation of the wheel;
   (e) applying a force to hold the bracket against the wheel surface for a predetermined time; and
   (f) mounting the tire pressure sensor to the wheel by way of the bracket attached to the wheel.

2. The method as recited in claim 1, wherein said step (a) includes adjusting a holding force to generate a predetermined amount of heat during said step (c).

3. The method as recited in claim 1, wherein said step (b) includes the step of adjusting a rotational speed of the wheel relative to the bracket for generating a predetermined amount of heat between the bracket and wheel during said step (c).

4. The method as recited in claim 1, wherein said step (e) includes the step of increasing the force applied to the bracket above, a force exerted during rotation of the wheel relative to the bracket.

5. The method as recited in claim 1, wherein said step (f) includes the step of snap-fitting the tire pressure sensor to the bracket.

6. The method as recited in claim 1, wherein one of said bracket and tire pressure sensor includes a tab corresponding to a slot on the other of said bracket and tire pressure sensor, and said step (f) includes inserting the tab into the slot.

7. The method as recited in claim 1, wherein the bracket is an integral portion of the tire pressure sensor such that said step (f) occurs concurrently with said steps (a) through (e).

* * * * *